United States Patent [19]

Doiron et al.

[11] Patent Number: 5,481,610
[45] Date of Patent: Jan. 2, 1996

[54] DIGITAL RADIO TRANSCEIVER WITH ENCRYPTED KEY STORAGE

[75] Inventors: Timothy J. Doiron; Steven T. Dreon, both of Forest; Mark D. Priest, Rustburg, all of Va.

[73] Assignee: Ericsson Inc., Lynchburg, Va.

[21] Appl. No.: 202,740

[22] Filed: Feb. 28, 1994

[51] Int. Cl.$^6$ .................................................. H04L 9/08
[52] U.S. Cl. ................................ 380/21; 380/46; 380/50
[58] Field of Search ............................ 380/4, 3, 21, 23, 380/46, 50

[56] References Cited

U.S. PATENT DOCUMENTS

| | | |
|---|---|---|
| 4,246,638 | 1/1981 | Thomas . |
| 4,446,519 | 5/1984 | Thomas . |
| 4,525,865 | 6/1985 | Mears . |
| 4,593,155 | 6/1986 | Hawkins . |
| 4,658,093 | 4/1987 | Hellman ........................... 380/4 |
| 4,771,459 | 9/1988 | Jansen ............................. 380/21 |
| 4,811,377 | 3/1989 | Kropp et al. ................... 380/3 |
| 4,853,962 | 8/1989 | Brockman ..................... 380/21 |
| 4,862,156 | 8/1989 | Westberg et al. . |
| 4,864,599 | 9/1989 | Saegusa et al. . |
| 4,888,802 | 12/1989 | Cooney ............................ 380/4 |
| 4,897,875 | 1/1990 | Pollard et al. ................. 380/21 |
| 4,941,174 | 7/1990 | Ingham .......................... 380/52 |
| 4,977,594 | 12/1990 | Shear ............................... 380/4 |
| 5,023,936 | 6/1991 | Szczutkowski et al. . |
| 5,027,397 | 6/1991 | Double et al. ................... 380/4 |
| 5,029,207 | 7/1991 | Gammie ......................... 380/21 |
| 5,068,894 | 11/1991 | Hoppe ............................ 380/21 |
| 5,077,790 | 12/1991 | D'Amico et al. .............. 380/23 |
| 5,091,942 | 2/1992 | Dent ............................... 380/46 |
| 5,093,862 | 3/1992 | Scwartz .......................... 380/4 |
| 5,109,403 | 4/1992 | Sutphin . |
| 5,115,467 | 5/1992 | Esserman et al. ............. 380/44 |
| 5,120,939 | 6/1992 | Claus et al. . |
| 5,132,729 | 7/1992 | Matsushita et al. .......... 380/23 |
| 5,144,667 | 9/1992 | Pogue, Jr. et al. ............ 380/21 |
| 5,148,485 | 9/1992 | Dent ............................... 380/46 |
| 5,150,412 | 9/1992 | Maru .............................. 380/23 |
| 5,153,919 | 10/1992 | Reeds, III et al. ............ 380/21 |
| 5,237,611 | 8/1993 | Rasmussen et al. .......... 380/21 |
| 5,241,597 | 8/1993 | Bright ............................. 380/21 |
| 5,249,227 | 9/1993 | Bergum et al. ................ 380/4 |
| 5,268,962 | 12/1993 | Abadi et al. ................... 380/21 |
| 5,301,247 | 4/1994 | Rasmussen et al. .......... 380/21 |

OTHER PUBLICATIONS

U.S. patent application of Cooper, 08/113,643, filed Aug. 31, 1993.

*Primary Examiner*—Salvatore Cangialosi
*Attorney, Agent, or Firm*—Nixon & Vanderhye

[57] ABSTRACT

A digital radio has standardized "key" storage for several different cryptosystems (DES, VGE, VGS, etc.). Cryptographic keys are stored in a table in non-volatile memory such as EEPROM. The "keys" are stored in an "encrypted" form such that their identities are not readily revealed by a "dump" of memory contents. Additional security is provided in accordance with the present invention by extracting the "keys" from the stored table and re-"encrypting" the entire table each time a key loader device is attached to the radio. Multiple key banks are used to provide enhanced voice security by increasing the number of encryption keys available for use by a radio.

43 Claims, 9 Drawing Sheets

FIG. 4

| keybank #1 bit mask (1 byte) | key # 1 data (# bytes depending on the encryption algorithm) | key #2 data | key #3 data | key #4 data | key #5 data | key #6 data | key #7 data | keybank #2 bit mask | key #1 data | key #2 data | key #3 data | key #4 data | key #5 data | key #6 data | key #7 data |
|---|---|---|---|---|---|---|---|---|---|---|---|---|---|---|---|
| | key # 1 CRC | key # 2 CRC | key # 3 CRC | key # 4 CRC | key # 5 CRC | key # 6 CRC | key # 7 CRC | | key # 1 CRC | key # 2 CRC | key # 3 CRC | key # 4 CRC | key # 5 CRC | key # 6 CRC | key # 7 CRC |

DIGITAL RADIO TRANSCEIVER WITH ENCRYPTED KEY STORAGE

FIELD OF THE INVENTION

This invention relates to radio frequency (RF) communications systems, and more particularly to digital radios having a "secure" mode that encrypts and decrypts messages. Still more particularly, the present invention relates to techniques for securely loading and storing cryptographic key information within a mobile or portable radio transceiver. Another feature of the present invention provides multiple "banks" of stored cryptographic keys.

BACKGROUND AND SUMMARY OF THE INVENTION

The widespread availability of police "scanners" and other inexpensive consumer radio receivers has created significant security problems for law enforcement and other radio users. For example, it is now possible for criminals to monitor police radio communications in order to discover police whereabouts and activities—and thereby elude the police. Although some police forces have adopted the practice of talking in "code" to make their communications less understandable, these codes often make informative conversation more difficult—and the "codes" typically are relatively easy to "decode" after listening to police conversations for a few weeks.

Modem state-of-the-art mobile radios are digital. They convert the user's voice into a digitized data stream consisting of "bits" having "1" and "1" values before sending the "bits" over the radio channel—and similarly they receive communications in digitized data stream form and convert the received "bits" into analog voice signals for reproduction by a loud speaker. Although the use of digitized speech transmission prevents most police "scanners" from receiving intelligible signals, more advanced "digital" radio receivers available to consumers or criminals may still allow eavesdropping. Moreover as the cost of "digital" scanning receivers comes down, this type of receiver will become more widespread. In addition, a certain class of radio users (e.g., people associated with the FBI, CIA, military and other highly sensitive organizations) require an extremely high degree of communications security. Thus, there is need for communications that provide greater security and protection against eavesdropping than can be achieved using digitized speech.

In response to this need for greater security, major manufacturers of land-mobile radio equipment in the United States have for many years incorporated "encryption" into their radio products. The state of radio electronics technology has advanced such that it is now practical and cost-effective to have the radio equipment automatically electronically "code" ("encrypt") and "decode" ("decrypt") communications electronically.

Briefly, "encryption" and "decryption" are part of "cryptography," the art of communicating securely in the presence of an "enemy" or "attacker". "Encryption" takes a "clear" text message and transforms it into unintelligible form ("cipher text"). "Decryption" reverses the process, transforming the cipher text back into the original "clear" text. In modem "cryptosystems" such as "DES" ("Data Encryption Standard"), it is computationally infeasible to derive the "clear" text from the cipher text unless one knows beforehand the particular transformation that should be employed. So long as the decryption transformation remains a closely guarded secret, parties to an encrypted communication can feel safe knowing that only authorized people (i.e., the people who know the specific decryption transformation to use) will be able to decrypt the encrypted communications. That is, even if an attacker successfully intercepts an encrypted message, the attacker will be unable to decrypt the message to recover the "clear" text.

Because of the difficulty of designing and verifying the security of a cryptosystem, it has become commonplace to define encryption and decryption transformations with two components: (a) an algorithm that defines a family of transformations; and (b) a cryptographic "key" that specifies a particular one of many (usually a very large number of) transformations within the family. The cryptographic algorithm can be contained in standard, readily available integrated circuit chips and may even be widely published (e.g., the details of the "DES" algorithm is published in Federal FIPS Publication No. 46). However, before the algorithm is used by, for example, Steve and Carole to encrypt and decrypt messages, Steve and Carole select and agree upon at least one cryptographic "key" they intend to use with the algorithm. Steve and Carole keep this cryptographic key a closely guarded secret. Since the cryptographic key determines the particular encryption/decryption transformation(s), an attacker who knows the basic cryptographic algorithm but doesn't know the key will be unable to decrypt intercepted encrypted communications. Moreover Carole and Tim can agree to use a different cryptographic key for their secure encrypted communication, and Steve intercepting the communication will be unable to decrypt it successfully. To provide increased security against long-term cryptographic attacks, "traffic analysis," etc., parties can agree to periodically change their agreed-upon cryptographic keys—or they may agree to use a different key if they feel the security of their communications has been compromised.

Ericsson-GE Mobile Radio Communications Inc. ("EGE") of Lynchburg Virginia has for many years sold products under the trade name VOICE GUARD which include a digitized voice encryption/decryption capability. Motorola Inc. of Schaumberg Illinois has similarly for many years sold "SECURE NET" land-mobile radio equipment including digitized voice encryption. Although prior radio products were limited to only a single encryption technique, more recent digital voice radios (i.e., EGE's AEGIS/VG digital radio products) currently use any one of three conventional key-based encryption o algorithms (DES, VGE or VGS) for securely transmitting digitized voice over an RF channel.

In using such systems, there arises a practical problem of how to load the secret cryptographic key(s) into all radio transceivers intended to participate in secure communications. In EGE's prior systems, the "key" information is loaded into each radio individually using a device called a "key loader." This keyloader device communicates with the radio over a serial data cable, and downloads "key" data into the radio for use in defining the particular encryption/decryption transformation to be used. The user may download "keys" to the radio at any time by connecting up the key loader to the radio and specifying the new key data. When the radio receives new "keys" from the key loader, it must store and retain the "keys" so that they can be retrieved every time the radio is subsequently turned on.

In prior radio products, the key storage method depended on the type of encryption algorithm in the radio. Prior EGE radio designs using DES encryption transferred the "key" data to a special-purpose DES encryption/decryption integrated circuit "chip" for storage. This DES "chip" is connected to a small battery (e.g., a lithium cell) that continually supplied power to the DES chip even when the rest of the radio is turned off. The solution of storing the "keys" in the DES chip is very secure since the radio microcontroller never "sees" (and cannot access) the key information once it is loaded, and any attempts to read the key information out of the DES chip will almost certainly result in erasure of the key information before it can be successfully read. However, this arrangement requires the existence of a battery-backed device to maintain the "keys" throughout the power cycle. Moreover, commercially-available DES chips have a limited key storage capacity whereas in the context of a mobile radio communications system it may be necessary for a given mobile radio to select between a number of different keys corresponding to, for example, a number of different secure communications recipients. In prior VGE encrypted radios sold by EGE, the key information was simply stored in a table in EEPROM ("Electrically Erasable Programmable Read Only Memory"). This storage solution removed the requirement for a battery-backed device, but was not very secure since the key information is simply in a table in EEPROM and thus can be read out by someone willing to take the time to "dump" the contents of EEPROM—a relatively simply process that can be performed using readily available, relatively inexpensive equipment. Because of this "reverse engineering" possibility, the security of the entire radio communications system becomes compromised if even a single radio transceiver falls into the wrong hands. Of course, it is always possible in such a system to change encryption keys on a system-wide basis—but the logistical difficulty of reprogramming each individual radio transceiver at a service depot using a key loader would cause secure communications to be disrupted for hours, days or even longer.

There have been prior attempts to securely store encryption keys within a mobile radio transceiver. See, for example, U.S. Pat. No. 5,150,412 to Maru, which discloses a mobile radio telephone including a single chip microcomputer (security module) including an internal non-volatile EEPROM encryption/decryption key store. Whenever external access of the EEPROM key store is attempted (e.g., in order to test the function of the key store), circuitry automatically clears the EEPROM contents—thereby preserving the secrecy of the encryption/decryption keys. This technique has the drawback of requiring a specially designed security module with special-purpose circuitry for destroying key store contents when external access is attempted.

It would be highly desirable to provide an arrangement for safeguarding the secrecy of encryption/decryption keys stored by a mobile/portable radio transceiver that does not require any additional hardware components or other costly additions to the transceiver architecture and yet provides flexibility in securely storing a large number of selectable different cryptographic keys.

The present invention provides a digital radio having a table in non-volatile memory such as EEPROM for "key storage" as in prior VGE products, but the "keys" are stored in an "encrypted" form such that their identities are not readily revealed by a "dump" of memory contents. Additional security is provided in accordance with the present invention by extracting the "keys" from the stored table and re-"encrypting" the entire table each time a key loader device is attached to the radio. This re-encryption adds another level of complexity to the process should someone attempt to "break" the cryptosystem by repetitively loading different "keys" into the radio.

In somewhat more detail, a digital radio provided by the present invention "hides" or "shrouds" its key store information by in some sense "encrypting" the key information before storing it in the radio's internal EEPROM memory. A pseudo-random function is used as part of the shrouding technique. This use of a pseudo-randomization factor means that the keys are shrouded differently from one radio to the next—and that the same radio shrouds the keys differently from one shrouding operation to the next. An unauthorized person trying to gain access to the keys will presumably "dump" the entire contents of the EEPROM including the key store, but this information will be useless unless she also knows the particular shrouding transformation used. To learn the shrouding technique, the attacker would have to dump the entire program store and reverse engineer the control program software in detail—an extremely expensive and time-consuming process exposing the attacker to copyright infringement liability.

A mobile or portable digital radio provided by the present invention first constructs and writes a table containing pseudo-random data into a key store section of internal EEPROM. The radio's cryptographic keys are written "over" the random data, and are written at locations which can change from one key loading operation to the next—thereby "hiding" the cryptographic keys by "burying" them somewhere in a "sea" of pseudo-random data. As an additional protection in the preferred embodiment, the keys before being stored are first "encrypted" in a sense that they are transformed based at least in part on random data stored in other parts of the table. As a result, the stored cryptographic keys are hidden among a series of random data values, and the stored key data itself "looks" like random data. As a result, an attacker would be unable to learn the identity of the stored cryptographic keys from a dump of the EEPROM table unless she knew where to find the stored keys within the table, and unless she also knew what particular transformation should be used to decrypt and thereby recover the keys.

In accordance with a further feature provided by the present invention, the entire table randomization and transformation process is repeated every time a key loader device is connected to the radio transceiver. The actual key data is extracted by performing an inverse transformation, and a random number generator is used to re-randomize the table. The key data is transformed using the newly randomized table and the cryptographic keys along with the associated (new) index are redeposited into the table. This means that the keys typically end up being stored in a different place within the table, and that a different decryption/extraction transformation based on the information stored in the table must be used to recover them.

In accordance with a further feature provided by the present invention, multiple key banks are used to provide enhanced voice security by increasing the number of encryption keys available for use by a radio. This feature provides the additional advantages that the number of times a radio must be key loaded is reduced, and the number of personality configurations for groups, channels, and systems is greatly increased.

Prior portable or mobile two-way radios store only a limited number of encryption keys (e.g., seven encryption keys for EGE's Voice-Guard private voice operation, and six encryption keys for EGE's AEGIS private voice operation). Different keys can be selected for channels, groups and special calls. The number of keys to choose from is very limited. Also, if the user feels private voice calls are no longer secure using the programmed key, the only choice the user has is to discontinue communications until the radio can be key loaded with new encryption keys. Key loading the radio can be very time consuming because each radio must be individually connected to the key loader.

The preferred embodiment provided by the present invention solves this problem by using multiple banks of encryption keys—all stored in the same random-data EEPROM table described above. The radio can store multiple banks of keys with n (e.g., six or seven) keys per bank to maintain compatibility with existing radios. The key bank to use can be specified on a per system basis using a radio personality. The radio personality can contain the same system data repeated multiple times with only the key bank changing. The following illustrates an exemplary radio personality:

| System | Key | Key Bank | Group | Key |
|--------|-----|----------|-------|-----|
| SYS1   | 3   | 1        | Fire  | 1   |
| SYS2   | 3   | 2        | Fire  | 1   |

(with key banks 1 and 2 containing different sets of cryptographic keys).

If users feel trunked calls on the group "fire" are no longer secure on system "SYS1," the users can instantly change to the other system "SYS2" and continue encrypted communications using different encryption keys stored in key bank 2. Increasing the number of keys available to the user provides for more configurations on the radio personality. For example, conventional (non-trunked) operation could use the first four banks of keys, and trunked operation could use the second four banks. Different banks and/or keys can be used for different cryptographic modes (e.g., VGS, VGE or DES). In addition, increasing the number of encryption keys that can be stored in the radio can reduce how often the radio needs to be key loaded.

BRIEF DESCRIPTION OF THE DRAWINGS

These and other features and advantages of the present invention will be better and more completely understood by referring to the following detailed description of the presently preferred exemplary embodiment in conjunction with the sheets of drawings of which:

FIG. 4 is a schematic diagram of plural key banks shown in FIG. 3;

DETAILED DESCRIPTION OF A PRESENTLY PREFERRED EXEMPLARY EMBODIMENT

Figure 1:
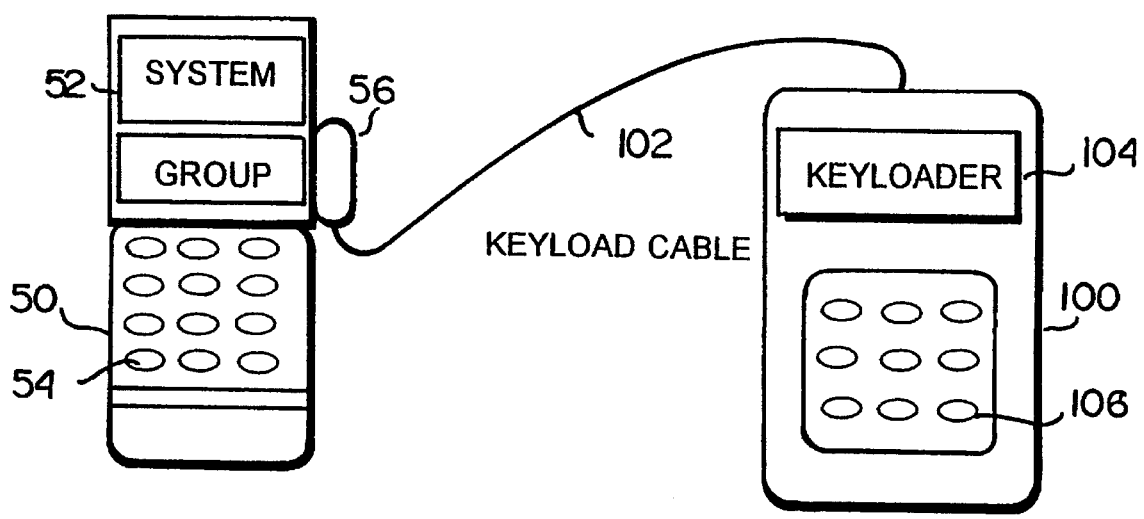
FIG. 1 is a schematic diagram showing a radio transceiver connected to a key loader device in accordance with the presently preferred exemplary embodiment of this invention.
Figure 2:
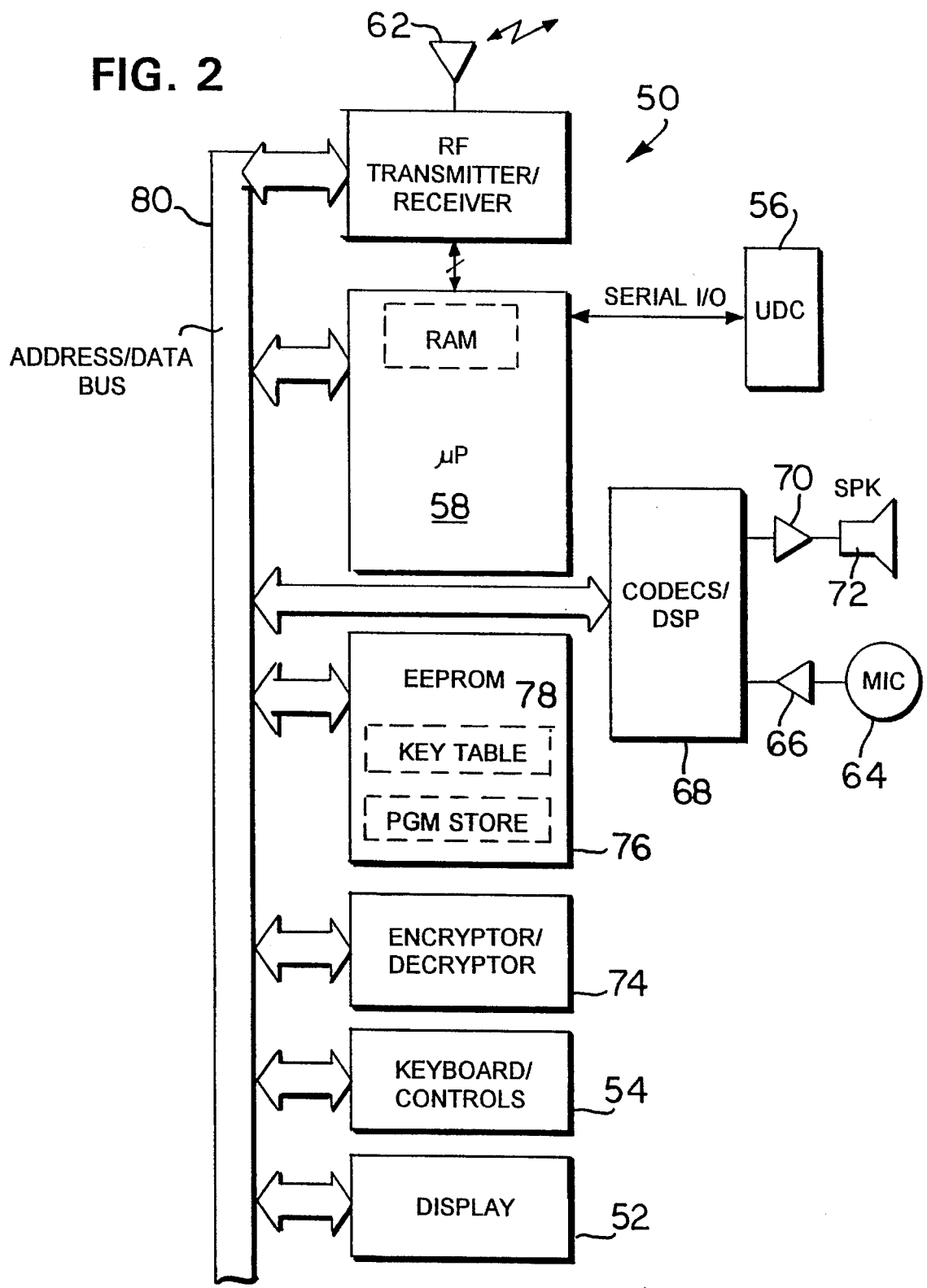
FIG. 2 is a block diagram of an exemplary radio transceiver architecture useful with the present invention.

Before describing the cryptographic key protection scheme provided by the preferred embodiment of the present invention, it may be appropriate to at least briefly describe the overall radio system environment in which the present invention may be useful. The present invention is particularly useful in the context of a so-called "digital radio" 50 such as a portable "walkie talkie" type radio or portable radio (e.g., of the type mounted on the dashboard of a vehicle). Radio 50 preferably is a digital radio transceiver having a display 52 and keypad 54 as shown in FIG. 1 and having an exemplary more detailed architecture as shown in FIG. 2. Radio 50 may be, for example, an MRK or ORION two-way digital "trunked" radio transceiver manufactured and sold by Ericsson-GE Mobile Communications, Inc. of Lynchburg, Va. A microcomputer 58 controls the operation of radio 50 and its included digital frequency-synthesized RF transmitter/receiver 60. As will be understood by those skilled in the art, microcomputer 58 controls the frequency at which the RF transmitter/receiver 60 operates (e.g., by sending digital frequency control signals to the transmitter/receiver), and also controls numerous other aspects of the RF transmitter/receiver operation (e.g., controlling the included transmitter to apply RF energy of a particular frequency to antenna 62 for radiation over the air to a distant receiver or repeater; controlling the transmitter to case transmitting and to unmute the receiver so as to allow the receiver to receive, amplify, filter and demodulate received RF signals at particular frequencies programmed by the microcomputer; and controlling other parameters relating to the operation of the receiver/transmitter such as, for example, RF power output level, modulation level, tone generation, etc.).

In the preferred embodiment, radio 50 may be operated in either a conventional "non-trunked" mode or in a digitally trunked mode. When operating in a conventional non-trunked mode, radio 50 typically transmits RF signals on the input frequency of a conventional RF repeater, and receives RF signals on the output frequency of that repeater (the input and output frequency being different and sufficiently spaced apart as understood by those skilled in the art). Conventional CTCSS or other selective squelch type signalling in either analog or digital form may be used to control access to the conventional non-trunked repeater, and radio microprocessor 58 may control transmitter/receiver 60 (or other components) to generate the appropriate selective squelch signalling to access the repeater.

In a trunked mode of operation, radio 50 may request a working channel for temporary use in communicating with other members of a common "group" by transmitting a digital inbound channel request message over a dedicated digital control channel, this message identifying the "group". This inbound channel request message is received by a trunked radio repeater site (not shown) and—assuming a working channel is available for assignment—the trunked repeater site responds to the message by transmitting a digital channel assignment message over the control channel to the requesting radio as well as to all other radios within the "group" specified by the requesting radio in its initial channel request message. Upon receiving the channel assignment message, all radios within the specified "group" shift their operating frequency to the assigned working channel. The trunked radio repeater site includes an additional repeater operating on the assigned working channel which receives RF signals transmitted by radios and "repeats" the received RF signals (typically at a higher power level) for receipt over a wide coverage area. When the communication(s) is finished, the trunked radio repeater site preferably sends a "unkey" digital message over the temporarily assigned working channel to cause all radios within the group to return to monitoring the dedicated digital control channel.

Radio 50 may be capable of transmitting signals in various forms. For example, it may be possible for radio 50 to transmit and receive analog voice-modulated FM signals. In addition, in the preferred embodiment, radio 50 is capable of transmitting and receiving digitized voice signals. In particular, referring to FIG. 2, when the radio's user speaks into a microphone 64, the resulting analog voice signals (after amplification by an amplifier 66) are converted from analog form into a stream of pulse code modulated ("PCM") digitized voice signal ("bits") using a conventional speech digitizer/converter 68 such as for example a CODEC or digital signal processor (DSP). This digitized voice signal may be applied to the RF transmitter modulator (not shown) within transmitter/receiver 60 for modulating an RF carrier to be radiated by antenna 62. Similarly, the receiver portion of transmitter/receiver 60 may receive digitized voice signals transmitted (e.g., via a repeater) by some other radio 50. The received digitized voice signals are demodulated by the transmitter/receiver 60 to produce a digitized voice data stream which is converted by CODEC/DSP 68 to analog voice signals for amplification by amplifier 70 and conversion into sound by speaker 2.

In order to provide a secure communications capability, radio 50 is equipped with an encryptor/decryptor 74. When the user selects a "secure" operating mode, the user's voice signals converted into digitized voice signals by block 68 are applied to the input of encryptor/decryptor 74. Encryptor/decryptor 74 may be, for example, a conventional DES (Data Encryption Standard) or other conventional off-the-shelf cryptosystem-based integrated circuit "chip" or, alternatively, encryption/decryption may be performed by microcomputer 58 under software control (assuming the microcomputer has a sufficient processing capacity). Encryptor/decryptor 74 uses one or more standard conventional algorithms (in conjunction with one or more cryptographic keys selected by the user) to transform or "encrypt" the digitized voice data stream into "cipher text."

The conventional algorithm defines a family of transformations with the specific transformation within the family being specified by the selected secret encryption/decryption "key." Users desiring to communicate with one another via encrypted messages agree beforehand on a common shared encryption/decryption key(s). The encryptor/decryptor 74 within the transmitting radio 50 encrypts the digitized voice data using the agreed-upon encryption key, and transmits the encrypted digitized data stream via modulated RF carrier radiated by antenna 62. A receiving radio 50 receives and demodulates the RF carrier to recover the encrypted digitized voice data, and applies this encrypted data to its encryptor/decryptor 74 operating in a decryption mode to apply an inverse transformation (using the same shared secret, or in some crypto-systems a different, agreed-upon cryptographic key) to recover the "clear" digitized data stream from the received cipher text. Block 68 converts the decrypted data back into analog speech signals for reproduction by loudspeaker 72.

An eavesdropper having an identical radio transceiver 50 but not having or knowing the specific encryption/decryption key(s) being used for a particular communication will be unable to decrypt the received digitized voice signals because his radio does not have the cryptographic key needed to perform the specific transformation/inverse transformation used to encrypt and decrypt. Communications will remain secure so long as the cryptographic key is kept secret.

Radio 50 further includes a non-volatile memory device 76 such as an EEPROM (electrically erasable programmable read only memory). EEPROM preferably stores program instructions for loading into and executing from a RAM (random access memory) within microprocessor 58. The operation of radio 50 is defined by executing these instructions with microcomputer 58. EEPROM 76 also includes so-called "personality" defining operating parameters defining the operation of radio 50 (such parameters may include, for example, operating frequencies, group and individual id's, tone frequencies, etc. as is conventional in this art). In addition, EEPROM 76 stores a key table 78 containing one or more cryptographic keys to be used by encryptor/decryptor 74.

Before operating in a secure mode, microcomputer 58 reads an appropriate selected encryption/decryption key from key table 78 and loads the key into encryptor/decryptor 74 (It will be understood by those skilled in the art that the data path between microcomputer and the encryptor/decryptor 74 may be protected to prevent signal analysis from revealing the cryptographic key). Key table 78 may store a number of different cryptographic keys in plural key "banks" or sets so that an entire repertoire of keys can be selected by selecting a different key "bank." Different cryptographic keys allow radio 50 to communicate securely with a variety of different parties such that none of the parties is able to decrypt encrypted communications intended for other parties. In addition, different cryptographic keys provide users with several alternate encryption/decryption keys in case the security of their communication has been breached.

Cryptographic keys must be initially loaded into radio 50. FIG. 1 shows radio 50 connected to a key loader device 100 via a key load cable 102. Radio 50 in the preferred embodiment includes a universal device connector ("UDC") 56 via which external devices such as key loader 100 and "PC Programmers" may communicate o with the radio over a serial data path (e.g., cable 102).

Key loader 100 in the preferred embodiment includes its own display 104 and key pad 106. A user may input cryptographic key information into radio 50 by depressing one or more controls of keyloader key pad 106. The inputted cryptographic key may be displayed on key loader display 104 before being transmitted to radio 50 via key load cable 102 for storage and use by the radio.

In more detail, the process of loading cryptographic keys into radio 50 involves connecting key loader 100 to the radio via four-wire or two-wire communication cable 102. Some radios (e.g., the MRK) use a four-wire communication protocol referred to as "synchronous mode communication," while other radios (e.g., the ORION radio) use a two-wire communication protocol referred to as "asynchronous communication." Cable 102 may, for example, include a standard conventional telephone jack on one end and a universal device connector type screw-on connector on the other end. The phone jack end of the cable 102 connects to key loader 100 while the other end connects to radio 50 via the UDC interface 56.

Key loader 100 has key pad 106 on its front surface to allow the user to enter key data for each cryptographic key to be loaded into radio 50. Before transfer to radio 50, the user must first enter the desired sequence of bytes into the key loader 100 for each cryptographic key he/she wishes transfer and use in the radio 50 (for security reasons, the preferred keyloader may destroy retained key information if someone attempts to disassemble the key loader to read out the information. Once the cryptographic key data is loaded into the key loader 100, the user presses a sequence of buttons 106 to transfer the data from the key loader to radio 50. Upon proper reception of the data and acknowledgement from radio 50, the key loader 100 indicates "GOOD TRANSFER" and the cryptographic key transfer is complete. This process may be repeated for additional cryptographic keys the user wants to load into radio 50. Unless the user desires to change the cryptographic key data for security reasons (or other reasons for that matter), the key transfer process to the radio is complete and does not need to be repeated.

As will be explained in more detail below, once the cryptographic key data is received by radio 50, the key data is "encrypted" (i.e., hidden and shrouded in some fashion to make it unintelligible to an attacker), before being stored in EEPROM non-volatile memory within the radio. Every time the key loader device 100 is connected to radio 50, the radio re-"encrypts" the existing cryptographic key data within the radio. This process involves extracting the cryptographic key data from its "encrypted" form, re-randomizing the encrypted key table, and then re-encrypting the actual key data for storage in the table. Table re-encryption occurs in the preferred embodiment even if the user connects and removes the key loader 100 without having transferred any additional key data. This provides another level of security by significantly altering the encrypted key table every time the key loader is connected.

Figure 3:
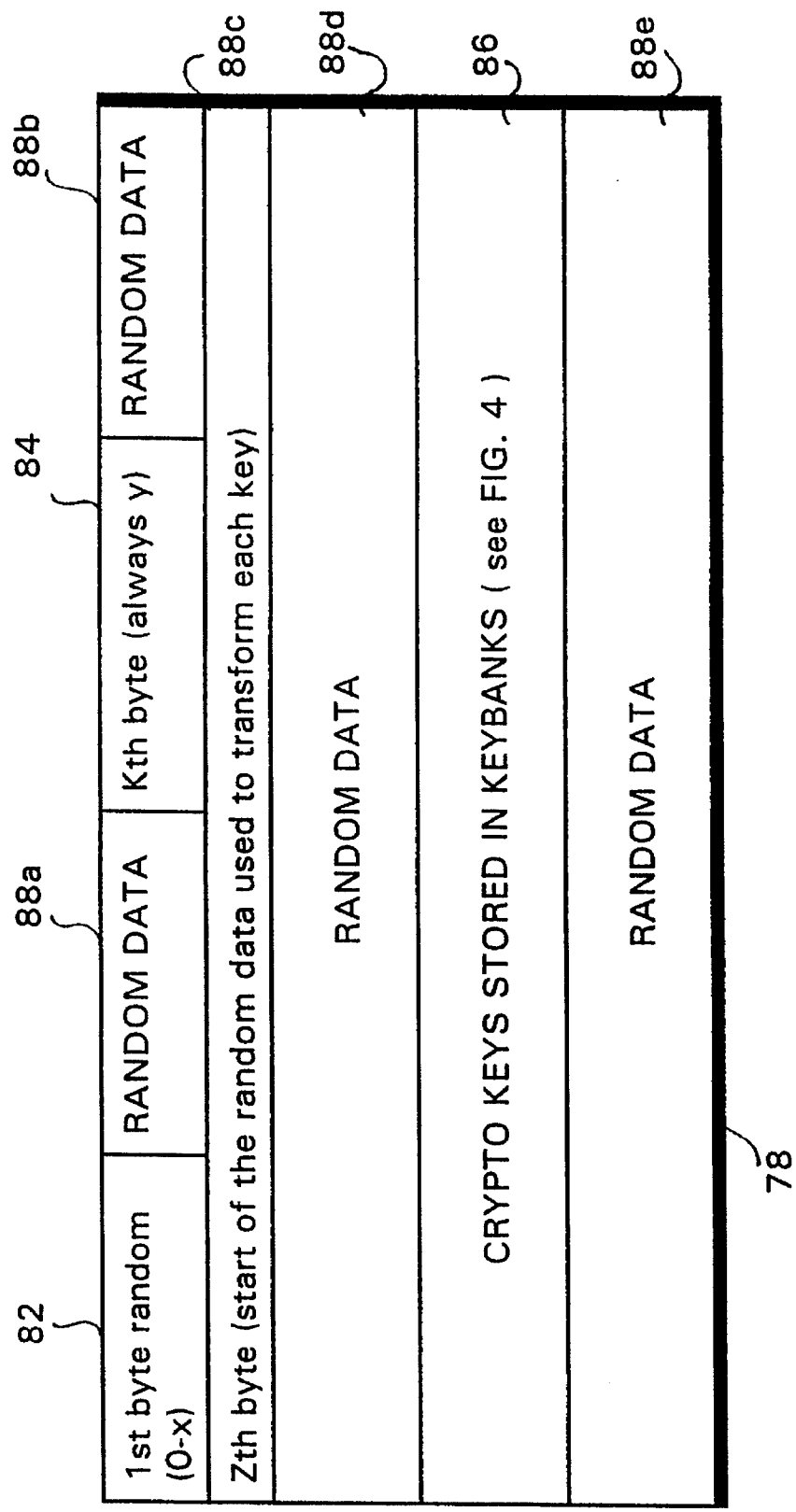
FIG. 3 is a schematic illustration of an exemplary key store data structure provided by the presently preferred exemplary embodiment of this invention.

FIG. 3 is a schematic diagram of an exemplary data structure used in the presently preferred exemplary embodiment of this invention for key table 78. Key table 78 in the preferred embodiment consists primarily of random data, with meaningful data "scattered" here and there separated by random data. The "meaningful" data stored within table 78 includes a first byte random value 82, a kth byte random value 84, and at least one (and typically many) cryptographic keys stored in key banks residing within a cryptographic key block 86. Blocks of random data separate each of lo these blocks of "meaningful" information. Thus, for example, a random data block 88a separates data values 82, 84; random data blocks 88b, 88c, 88d separate value 84 from the cryptographic key block 86; and a random data block 88e is stored after cryptographic key block 86 within table 78. In the preferred embodiment, it is very difficult for an attacker to tell the random data 88 from the "meaningful" data 82, 84, 86—and therefore the random data in some sense "hides" or "shrouds" the meaningful data to make it difficult for the attacker to extract the meaningful data.

FIG. 3 thus shows how the actual encrypted key data is completely surrounded by pseudo-random data blocks 88d, 88e. Moreover, the starting address of the encrypted key block 86 is variable according to a starting address calculated as a function of values 82, 84 (the variability occurs because value 82 is also pseudo-random number albeit limited in range). In accordance with an important aspect of the present invention, every time the key loader 100 is attached, a new pseudo-random data value 82 is written to table 78 thus changing the starting location of the encrypted key block 86. Moreover, since the contents of the random data blocks 88c, 88d changes each time the key loader is attached, an encryption/decryption transformation used to encrypt the cryptographic keys before they are stored in block 86 also changes each time key loader 100 is attached.

When radio 50 is initialized, it is typically first connected to a "pc programmer" type device (not shown) well known by those skilled in this art. Such a "pc programmer" is responsible for writing the "personality" and other information stored within EEPROM 76. The "pc programmer" may, for example, connect to radio 50 via UDC 56. In the preferred embodiment, this "pc programmer" reserves space for the key table 78 in EEPROM 76 by constructing and writing key table 78 as a table of all zeros to EEPROM in response to the user specifying a key size and the number of encrypted key banks. The size of key table 78 in bytes is directly evaluated from the following equation:

$$table\ size = (\#of\ banks) * (\#keys\ per\ bank) * (key\ size + \#CRC\ bytes) + h$$

where "# of banks" is the number of different key banks, "# keys per bank" is the number of cryptographic keys stored within each key bank, "key size" is the length in bytes of each cryptographic key, "number CRC bytes" is the number of additional bytes per cryptographic key used to provide CRC or other error checking information, and "h" is an additional number of bytes used by random data blocks 88a, 88b, 88c, 88d, 88e used to help hide the key information. In the preferred embodiment, there are seven cryptographic keys allowed per bank, a CRC field stored with each key to verify data integrity, and a maximum number of four or eight key banks (depending upon the length of each cryptographic key).

When key loader 100 is connected to radio 50, the radio microcomputer 58 initially writes the entire key table 78 with random data. This random data may be generated using a conventional pseudo-random number generator. Any desired conventional pseudo-random number generator capable of running relatively efficiently on microcomputer 58 is suitable for this use. See, for example, Schneier, Bruce, *Applied Cryptography*, Chapter 15 entitled "Random Sequence Generators and Stream Cyphers" (1994 John Wiley & Sons Inc.) for a discussion of various different pseudo-random number generators suitable for generating a string of pseudo-random data values that could be used to fill table 78 with random data.

Once table 78 has been filled with random data, the kth byte 84 in the preferred embodiment is overwritten with a certain known value "y". Another byte 82 in table 78 is then preferably limited in value to a pseudo-random value between zero and x. An index pointer used to address or "point" to the beginning of cryptographic key block 86 is then calculated as a function of these two bytes 82, 84. Any desired function may be used to perform this index pointer calculation, although it is preferable to use a function that is relatively efficient for microcomputer 58 to calculate. The ranges of values stored in bytes 82, 84 used as input to this function are constrained as described above so that cryptographic key block 86 falls entirely within table 78.

FIG. 4 schematically shows one exemplary configuration for cryptographic key block 86. In the example shown, two key banks 86a, 86b are shown but the preferred embodiment can provide as many as four or eight key banks depending upon the length of the cryptographic keys. In the preferred embodiment, each key bank begins with a "key bit-mask byte" 90 that indicates which keys within the bank have been successfully loaded by key loader 100. Initially, the bit-mask byte 90 is zero. As cryptographic keys are loaded into the bank 86, the bit-mask byte 90 is updated to indicate which keys within the bank are valid. The actual cryptographic key information is stored after the bit-mask byte 90, with a CRC appended to each key. Key 1 is followed by key 2 up to key 7 as shown in FIG. 4. When key loader 100 downloads a "good" key into one of these seven places, bit-mask byte 90a is updated with a "one" in an appropriate bit position indicating the key is valid, and the key data is stored in the corresponding place. Storing multiple key banks as shown in FIG. 4 expands the number of keys allowed in the radio at one time. In previous EGE radios, a maximum of seven keys could be retained by the radio. With multiple key banks, the radio can now store up to eight banks of seven keys per bank. This effectively increases the number of keys in the radio from seven to a maximum of fifty-six. The user chooses a key for private voice calls by specifying both the key number and the bank number in the personality of the radio. As an example, the user can specify in the radio personality when on "candlers" system and the "psrs" group the radio should use the key data contained in "key 3" of "bank 2" for private digital voice calls. The information stored in EEPROM 78 relating to the "personality" associated with this configuration is created by a pc programmer supplied by Ericsson-GE Mobile Communications to customers that purchase EGE's mobile/portable radio products. Organizing the keys into banks means that an entirely different set of keys can be selected by simply selecting a different bank.

Cryptographic key block 86 in the preferred embodiment is stored in "encrypted" form, meaning that it is transformed or "encrypted" into unintelligible form before being stored in the EEPROM 76. Radio 50 decrypts key information read from EEPROM 76 back into intelligible "clear" form before the radio uses the key information with encryptor/decryptor 74. In the preferred embodiment, the encryption/decryption transformation used to encrypt the keys is based at least in part on the random data value stored within random data block 88c, 88d. In other words, each value stored within key bank 86a, for example, in the preferred embodiment is the result of a transformation of the cryptographic key information obtained from keyloader 100 with the particular transformation used being based on the value(s) of one or more random data bytes stored within blocks 88c, 88d. Preferably, the CRC values for each key are also transformed in this manner. The transformation used may be any convenient transformation so long as it is invertible and relatively efficient for microcomputer 58 to perform. Any of the random data bytes within blocks 88c, 88d may be used to transform the key data. Thus, for example, some selected byte or bytes of random data within block 88c, 88d may be used to transform all of the key data, different random data values within these random blocks may be used to transform different portions of the stored key data, etc. Additional security is provided by making this transformation variable (i.e., dependent at least in part on pseudo-random data values stored in blocks 88c, 88d).

When radio 50 needs to access a selected stored key within table 78, the user (or some software mechanism under the user's control, e.g., correlated to "group radio select" and "system select") selects a particular key bank and associated cryptographic key number (e.g., 1–7). Radio microcomputer 58 accesses values 82, 84 in order to determine the beginning of key block 86, and then accesses the appropriate key bank bit-mask 90 in order to determine whether the selected key is valid. If the key is valid, microcomputer 58 reads the associated encrypted cryptographic key data and associated CRC information from bank 86, and also reads a portion or portions of random data blocks 88c, 88d to determine the inverse (decryption) transformation needed to extract the actual cryptographic key data from the information read from the cryptographic key block 86. Microcomputer 58 then applies this inverse transformation to decrypt the read key information—thereby providing the cryptographic key in appropriate "clear" unencrypted form. Microcomputer 58 applies this cryptographic key to encryptor/decryptor 74 for use in encrypting and decrypting secure communications as described above.

In accordance with an important aspect of the present invention, every time key loader 100 is connected to radio 50, the entire key table 78 shown in FIG. 3 is overwritten with new values. Specifically, microcomputer 58 reads the entire cryptographic key block 86 and extracts the associated cryptographic keys using the appropriate inverse transformation as determined by random data blocks 88c, 88d. These "clear" cryptographic keys are temporarily stored by microcomputer 58 in its internal RAM memory. The psuedo-random number generator is then used to rewrite table 78 with a new set of random values. The bytes 82, 84 are again reinitialized in order to locate the start of block 86, and microcomputer 58 rewrites the entirety of block 86 using the appropriate encryption transformation based upon the "new" contents of random data blocks 88c, 88d. Thus, the keys along with their associated bit-mask byte 90 are redeposited into table 78 starting at the address pointed to by a function of "new" pseudo-random value 82 and value 84 in the table 78. Table re-encryption occurs in the preferred embodiment even if the user connects and removes key loader 100 without having transferred any additional key data. This provides another level of security by significantly altering configuration of the encrypted key table 78 every time the key loader 100 is connected.

Figure 5:
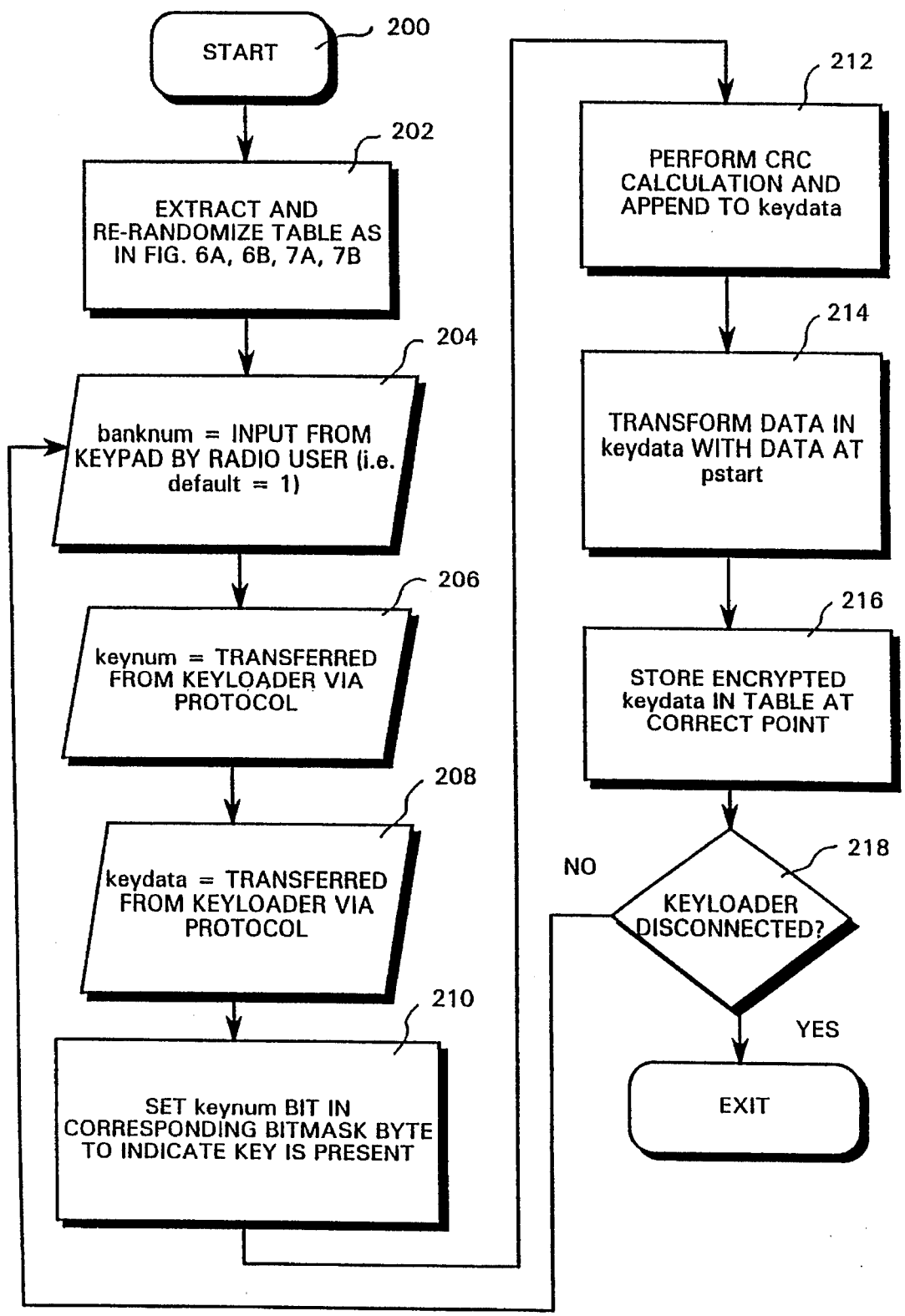
FIG. 5 is a flowchart of exemplary program control steps performed by the preferred embodiment radio shown in FIG. 1 to receive and store the keys transmitted by the key loader.
Figure 6A:
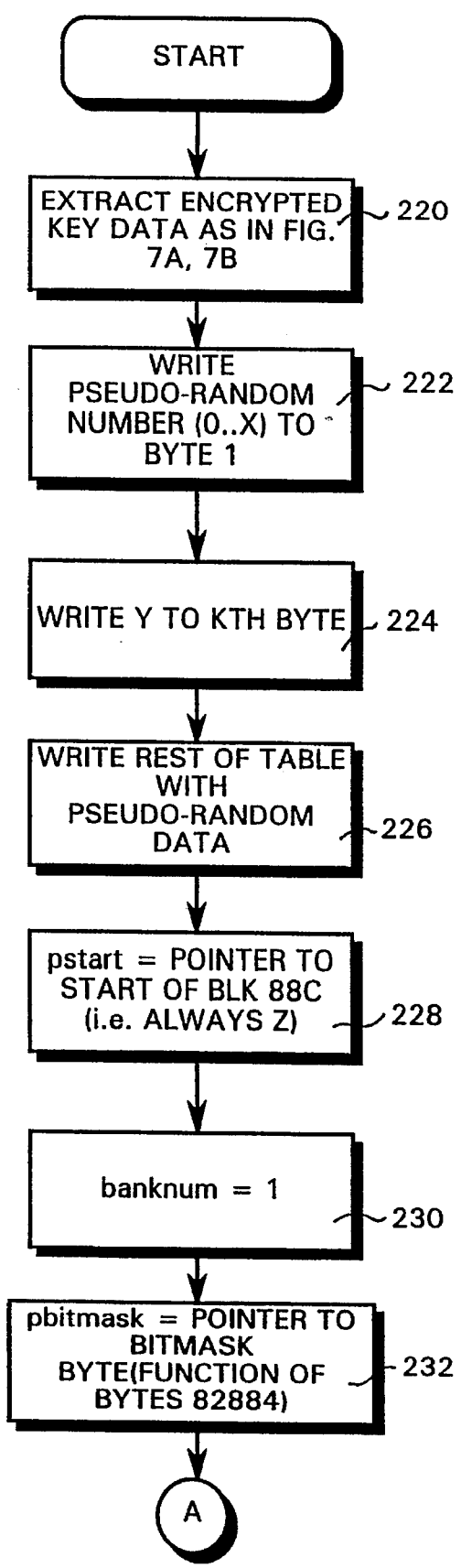
FIGS. 6a and 6b together are a flowchart of exemplary program control steps performed by the preferred embodiment radio to randomize or re-randomize the key store table.
Figure 6B:
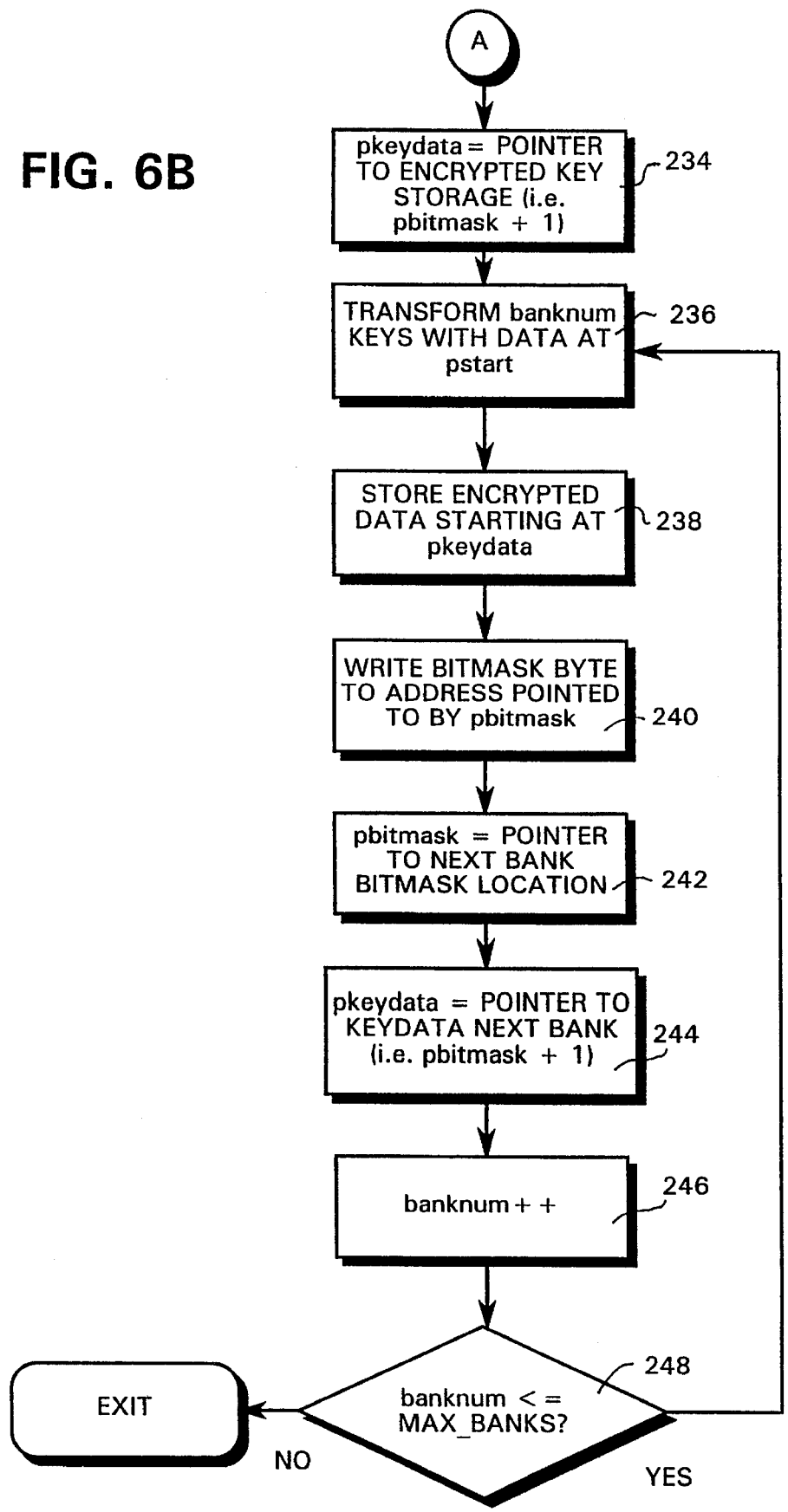
Figure 7A:
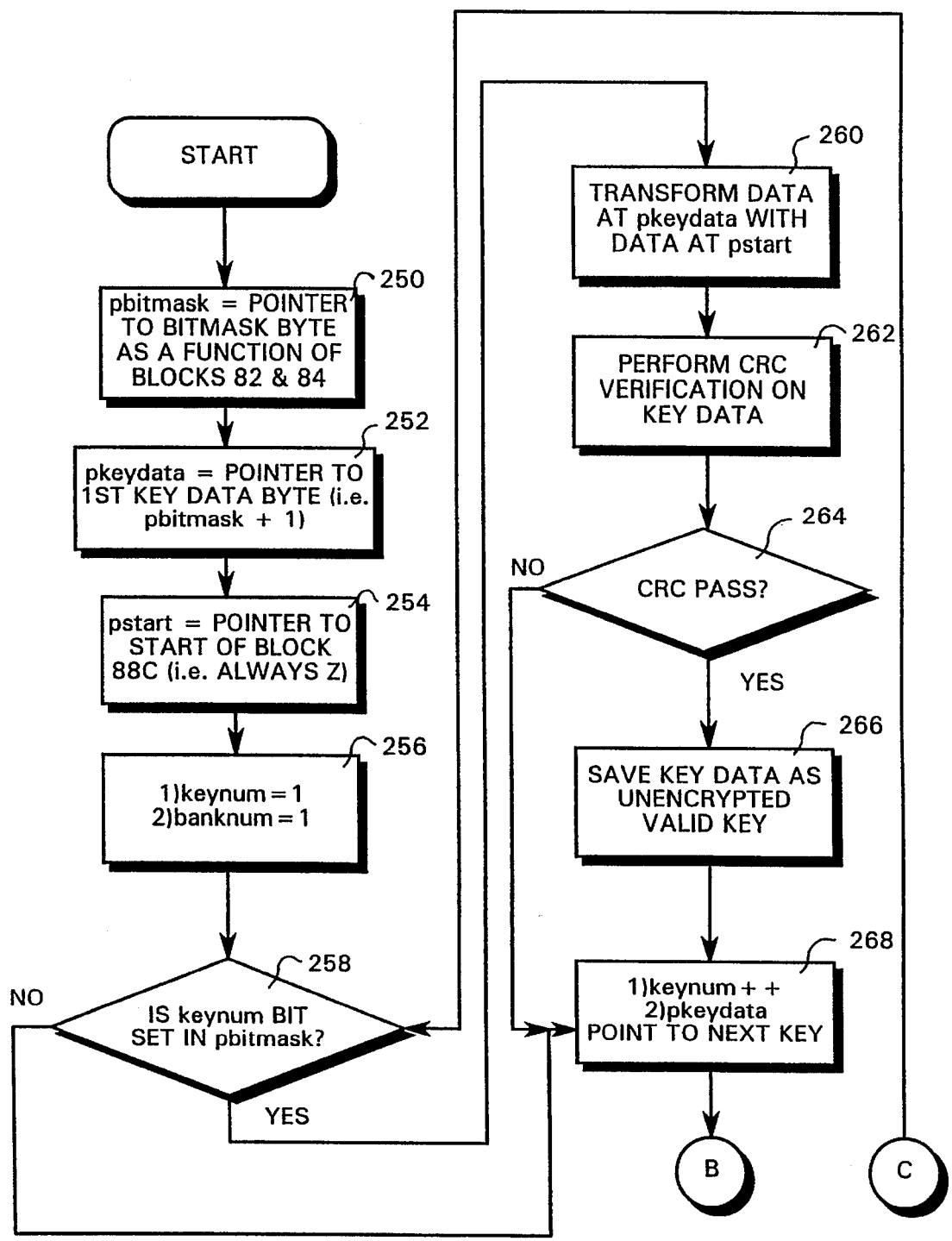
FIGS. 7a and 7b together are a flowchart of exemplary program steps performed by the preferred embodiment radio to extract encrypted keys from the key store table shown in FIG. 3.
Figure 7B:
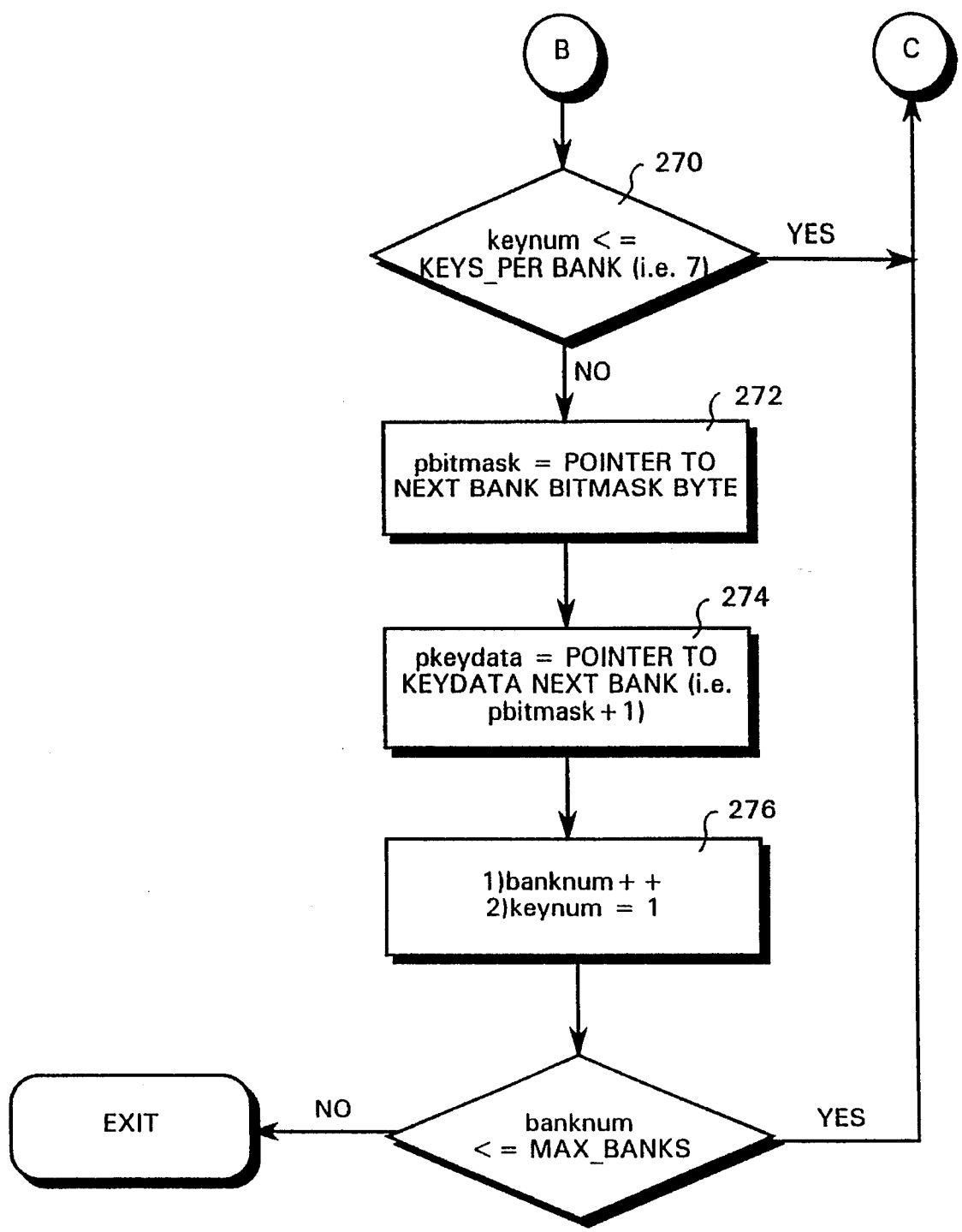

FIGS. 5, 6a, 6b, 7a and 7b are flowcharts of exemplary program control steps performed by radio microcomputer 58 to manipulate and otherwise handle the key data structure shown in FIG. 3. The key transmission/storage routine 200 shown in FIG. 5 is performed each time key loader 100 is connected to radio 50. FIGS. 6A & 6B show the routine performed by microcomputer 58 to (re)randomize table 78 with pseudo-random values, and FIGS. 7A & 7B show the routine microcomputer 58 performs to extract encrypted cryptographic keys from table 78.

Referring now to FIG. 5, microcomputer 58 detects when key loader 100 is attached to UDC 56, and executes routine 200 o based upon stored program control instructions within EEPROM 76 or other memory device (e.g., an additional program ROM). The first thing microcomputer 58 does is to extract and re-randomize cryptographic key table 78 in the manner shown in FIGS. 6a, 6b, 7a and 7b to be discussed below (block 202). The result of this block 202 is that any cryptographic keys formerly stored in EEPROM key table 78 are temporarily stored in clear text form within microcomputer RAM, table 78 is rewritten with pseudo-random values as described above, and the keys are encrypted using a new transformation dependent on the new random data within the table and again stored within the table. Microcomputer 58 then expects to receive a bank number command inputted from radio key pad 54 (and/or key loader key pad 106) indicating which of the plural cryptographic banks a new key is to be stored into (block 204). The user next inputs the key number (1–7) by depressing an appropriate button of key loader key pad 106, the resulting value of which is transferred from the key loader 100 to radio microcomputer 58 via a serial communications protocol over key load cable 102 (block 206). After receiving the bank number and key number values specified by the user at blocks 204, 206, radio microcomputer 58 "knows" where (i.e., which bank and which key entry within a bank) to store a "new" cryptographic key. The user next inputs the cryptographic key itself via the key loader key pad 106, and this value is transferred to the radio microcomputer 58 via key load cable 102 (block 208).

Once radio 50 has successfully received the new key from keyloader 100, radio microcomputer sets the appropriate bit within the bit-mask 90 corresponding to the selected key bank (see FIG. 4) to indicate that a new key is present and valid (block 210). Radio microcomputer 58 performs a CRC calculation on the key information, and appends the calculated CRC value to the received key data (block 212). Microcomputer 58 then transforms the received key data and associated appended CRC information based on the random data stored within random data blocks 88c, 88d (block 214)—thereby encrypting this key information so as to make it unintelligible unless one knows the appropriate inverse transformation. Radio microcomputer 58 then stores the encrypted key data and CRC information within table 78 at the correct point within the selected one of key bank blocks 86 (block 216). This correct point is determined by bytes 82 and 84, the "keynum" pointer, and the "banknum" pointer in the preferred embodiment.

Radio microcomputer 58 then determines whether the key loader 100 has been disconnected (block 218). If the key loader has not yet been disconnected, radio microcomputer 58 performs blocks 204–218 again to accept an additional new cryptographic key. This process continues iteratively until the user has finished loading new keys into radio 50 and disconnects key loader 100.

FIGS. 6a–6b together are a flow chart of exemplary program control steps performed by radio microcomputer 58 to re-randomize the random value stored within table 78. Before microcomputer 58 re-randomizes table 78, it first extracts all encrypted key data using the extraction routine shown in FIGS. 7a, 7b (block 220). Then, microcomputer 58 generates and writes a pseudo-random value (within the range of 1–x) to byte 82 shown in FIG. 3 (block 222). Microcomputer 58 then writes a constant value "y" to the kth byte 84 within table 78 (block 224). Microcomputer 58 next writes the entire rest of table 78 with pseudo-random data generated using a conventional pseudo-random number generating routine (block 226). Microcomputer then sets an internal pointer "pstart" to point to the start of the random data block formed by 88c, 88d shown in FIG. 3 (i.e., always the zth byte in the preferred embodiment) (block 228). Microcomputer 58 in the preferred embodiment then sets the bank number to 1 (block 230) and sets a bit-mask pointer to point to the bit-mask byte 90 corresponding to bank 1. This pointer is calculated based upon bytes 82, 84 (block 232). The preferred embodiment microcomputer 58 then sets another pointer "pkeydata" to point to the encrypted key storage block 86 corresponding to key bank #1 (i.e., "pbitmask+1" initially since block 86 is stored contiguously with and immediately following its key bit-mask byte 90 in the preferred embodiment) (block 234).

Microcomputer 58 then transforms the cryptographic keys of the associated bank number (which are now stored in microcomputer RAM) with the random data stored within blocks 88c, 88d in order to encrypt the cryptographic keys (block 236). Microcomputer 58 next stores the cryptographic key data so encrypted starting at address "pkeydata" (block 238), and writes the appropriate bit-mask byte value to the address pointed to by "pbitmask" (block 240). Microcomputer 58 then updates "pbitmask" to point to the next bank bit-mask location (which in the preferred embodiment is the byte immediately following the end of the last-written key bank 86 (block 242), and updates the pointer "pkeydata" to point to the next bank's key data (i.e., pbitmask+1) (block 244). Microcomputer 58 next increments the bank number value (block 246), and tests whether the last bank has already been written (decision block 248). If more banks are to be written, then microcomputer 58 repeats the steps of block 236–248 for the next key bank and does this iteratively until all key banks have been written.

FIGS. 7a, 7b together are a flow chart of exemplary program control steps performed by microcomputer 58 to extract encrypted keys from table 78. To extract encrypted keys, microcomputer 58 first sets a pointer "pbitmask" to point to the bit-mask byte 90a corresponding to key bank #1. (This address is pointed to by a function of values 82, 84, see FIG. 3) (block 250). Microcomputer 58 next sets a pointer "pkeydata" to point to the first key data byte within bank 1 (i.e., "pbitmask"+1) (block 252). Microcomputer 58 next sets a pointer "pstart" to point to the start of the random data block 88c, 88d used to encrypt/decrypt cryptographic keys (see the preferred embodiment, this block always starts at z) (block 254). The preferred embodiment microcomputer 58 next sets "keynum" to 1, and sets "banknum" to 1 (block 256). Microcomputer 58 next checks whether the "keynum" cryptographic key has a corresponding bit set in the bit-mask pointed to by "pbitmask" (this test determines whether the key is valid or not) (decision block 258). If the corresponding key is valid ("yes" exit to decision block 258), microcomputer 58 transforms (decrypts) the data stored at the location pointed to by "pkeydata" using the random data within random data block 88c, 88d (block 260), and then performs a CRC verification check on the resulting extracted cryptographic key and associated CRC information (block 262). Assuming the CRC check succeeds (decision block 264), microcomputer 58 stores the extracted key data as an unencrypted valid key within its internal RAM (block 266). Microcomputer 58 then increments the pointer "keynum," and updates the pointer "pkeydata" to point to the next key in the current key bank (block 268). Microcomputer 58 next checks to determine whether there are any more keys in the current bank to extract (decision block 270). If there are more keys to extract, microcomputer 58 repeats block 258–268 to extract the next key. For any keys that don't exist (as indicated by the bit-mask 90 and tested for by decision block 258), blocks 260–268 are skipped. When all keys of the current bank have been extracted and stored into RAM ("no" exit to decision block 270), microcomputer 58 updates pointer "pbitmask" to point to the next bank bit-mask byte (block 272), sets the pointer "pkeydata" to point to the key data block 86 of the next bank (block 274), increments the bank number "banknum" and resets "keynum" to 1 (block 276), and then executes blocks 258–276 again to extract the next key bank. This process continues iteratively until all key banks have been extracted (as tested for by decision block 278).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digital radio comprising:
   a RF transmitter for transmitting digital signals over a radio frequency link;
   a RF receiver for receiving digital signals transmitted over said radio frequency link;
   a non-volatile memory device;
   an encryptor/decryptor coupled to said memory device for cryptographically transforming said transmitted and/or received digital signals based on at least one cryptographic key stored within said memory device; and a further arrangement coupled to said memory device, said further arrangement writing, into said memory device, said cryptographic key within a field of randomized data, said further arrangement hiding said stored cryptographic key within said stored randomized data field, said further arrangement ensuring that said cryptographic key is transformed before said cryptographic key is stored within said memory device and for ensuring that said stored cryptographic key is inversely transformed before it is used by said encryptor/decryptor to cryptographically transform said transmitted and/or received digital signals, wherein said farther arrangement repetitively applies different transformations to said cryptographic key.

2. A radio as in claim 1 wherein said further arrangement stores said cryptographic key into said memory device in one of a plurality of key banks.

3. A radio as in claim 1 wherein said further arrangement includes means for storing pseudo-random data into said memory device, and wherein said further arrangement transforms said cryptographic key at least in part in response to said stored pseudo-random data.

4. A digital radio as in claim 1 wherein said further arrangement overwrites portions of said field of randomized data with said cryptographic key, said overwritten cryptographic key disposed entirely within said field of randomized data.

5. A digital radio as in claim 1 wherein said transformation and said inverse transformation are based at least in part on portions of said randomized data field.

6. A digital radio as in claim 1 wherein said further arrangement includes means for exclusive-ORing said cryptographic key with portions of said randomized data to provide a result, and for storing said result in said memory device within said randomized data field.

7. A digital radio as in claim 1 wherein said further arrangement stores at least one pseudo-random value within said randomized data field, and wherein said further arrangement includes means for calculating a starting address within said randomized data field based on said pseudo-random value and for storing said cryptographic key within a key bank beginning at said starting address.

8. A method of communicating securely between first and second radio frequency transceivers over an insecure radio frequency channel, said method including the following steps performed by each of said first and second transceivers:

(a) storing cryptographic key information in first and second key banks;

(b) selecting one of said first key bank and said second key bank, and also selecting personality data defining at least one further operating characteristic of said transceiver; and (c) using cryptographic key information from said selected key bank to encrypt and/or decrypt radio frequency transmissions communicated at least in part in accordance with said further operating characteristic, wherein:

said step (c) includes selecting a discrete cryptographic key based on a key bank selector and a key selector; and said method further includes changing said key bank selector without changing said key selector in order to select any of plural cryptographic keys associated with the same communicating first and second radio frequency transceivers.

9. A method as in claim 8 wherein said step (c) includes the following steps:

(i) reading said cryptographic key information from said selected key bank;

(ii) decrypting said cryptographic key information to produce a "clear" key code; and (iii) encrypting a digitized voice data stream based on said "clear" key code.

10. A method as in claim 8 wherein said step (a) includes encrypting a plurality of discrete cryptographic keys, storing at least one of said encrypted keys in said first key bank, and storing at least another of said encrypted keys in said second key bank, said first and second radio frequency transceivers alternatively selecting from said first bank encrypted keys and said second bank encrypted keys for communicating therebetween.

11. A method as in claim 8 wherein said storing step (a) includes:

(1) storing pseudo-random data into a non-volatile memory, and (2) overwriting only some of said stored pseudo-random data with said cryptographic key information.

12. A method as in claim 8 wherein said storing step (a) includes:

(1) storing pseudo-random data into a non-volatile memory, and (2) hiding said cryptographic key information within said stored pseudo-random data.

13. A method as in claim 8 wherein said storing step (a) includes:

(1) generating a pseudo-random value, and (2) storing said cryptographic key information into a non-volatile memory beginning at a starting address determined at least in part in response to said pseudo-random value.

14. A method as in claim 13 wherein said storing step (a) further includes storing said pseudo-random value within said non-volatile memory.

15. A method as in claim 8 wherein said storing step (a) includes:

(1) storing pseudo-random data into a non-volatile memory;

(2) transforming said cryptographic key information at least in part based on said stored pseudo-random data; and (3) storing said transformed cryptographic key information into said nonvolatile memory.

16. A method as in claim 15 wherein:

said storing step (1) includes writing first and second pseudo-random data into said non-volatile memory;

said transforming step (2) comprises transforming said cryptographic key information based on said first stored pseudo-random data; and said storing step (3) comprises overwriting said second stored pseudo-random data with said transformed cryptographic key information.

17. A method of operating a digital two-way radio frequency transceiver of the type having an non-volatile memory comprising the following steps:

(a) defining first and second key banks;

(b) defining a variable value;

(c) storing a first plurality of cryptographic keys into said first key bank at a variable location within said non-volatile memory, including the step of selecting said variable location based on said defined variable value;

(d) storing a second plurality of cryptographic keys into said second key bank at a variable location within said non-volatile memory, including the step of selecting said variable location based on said defined variable value;

(e) selecting between said first key bank and said second key bank;

(f) selecting a cryptographic key stored within said selected key bank;

(g) converting analog speech signals into digitized data;

(h) encrypting said digitized data using said selected cryptographic key to provide encrypted digitized data;

(i) generating a radio frequency carrier signal;

(j) modulating said radio frequency carrier signal with said encrypted digitized data;

(k) transmitting said modulated radio frequency carrier signal over the air;

(l) repeating said step (b) to define a further variable value; and (m) repeating said steps (c) and (d) to store said first and second key banks at variable locations different from said first-mentioned variable locations based on said defined further variable value.

18. A method as in claim 17 wherein said steps (c) and (d) include the step of encrypting cryptographic keys before storing them, and said method further includes the step of decrypting said encrypted selected cryptographic key before performing said encrypting step (h) with said decrypted selected cryptographic key.

19. A method as in claim 17 wherein:

said defining step (b) comprises:
generating a pseudo-random value constrained within a range, and
providing a second, fixed value; and said storing steps (c) and (d) each include the step of calculating at least one address based at least in part on said pseudo-random value and said second, fixed value.

20. A method as in claim 17 wherein:

said method further includes storing a field of pseudo-random data within said non-volatile memory; and said storing steps (b), (c) result in overwriting less than all of said stored pseudo-random data field with said first and second key banks.

21. A method as in claim 17 wherein said storing steps (b), (c) include encrypting said first and second plurality of cryptographic keys prior to storing said keys in said memory.

22. A method as in claim 21 wherein said cryptographic keys encrypting step comprises transforming said cryptographic keys based at least in part on data stored in said non-volatile memory.

23. A method as in claim 22 further including storing randomized data in said memory, and wherein said transforming step comprises transforming said cryptographic keys based at least in part on said stored pseudo-random data.

24. A method of protecting cryptographic keys retained by a radio transceiver comprising:

(a) connecting a keyloader to a radio transceiver; and (b) performing the following steps in response to said connecting step (a):

(1) reading, from said radio, stored cryptographic key information encrypted using a first encryption transformation;

(2) decrypting said read cryptographic key information;

(3) encrypting said decrypted cryptographic key information using a second encryption transformation different from said first encryption transformation, (4) storing a field of randomized data within said radio, and (5) storing and hiding within said stored randomized data field said key information encrypted by said step (3).

25. A method as in claim 24 wherein said storing and hiding step (5) includes the step of storing said encrypted key information into said radio beginning at a variable location within a non-volatile memory device.

26. A method as in claim 24 wherein said storing and hiding step (5) includes the step of storing said encrypted key information into said radio beginning at a random location within a radio non-volatile memory device.

27. A method as in claim 24 wherein said storing and hiding step (5) includes the step of storing said encrypted key information into said radio within a portion of a radio non-volatile memory device that contains shrouding data.

28. A method as in claim 24 wherein said storing and hiding step (5) includes the step of storing said encrypted key information into said radio beginning at a random location within a portion of a radio non-volatile memory device that contains random data.

29. A method as in claim 24 wherein said encrypting step (3) comprises transforming said cryptographic key information based at least in part on randomized data stored by said storing step (4).

30. A method as in claim 24 wherein said storing and hiding step (5) comprises storing said key information beginning at an address calculated based on at least some of said stored randomized data.

31. A secure method for storing cryptographic keys within the non-volatile memory of a radio device, said method comprising:

(a) storing shrouding data within said radio device non-volatile memory, said shrouding data occupying a block of memory addresses;

(b) providing a variable value;

(c) generating a memory address within said block based at least in part on said variable value; and (d) hiding said cryptographic keys within said stored randomized data by storing said cryptographic keys within said shrouding data beginning at said generated memory address.

32. A secure method as in claim 31 further including the following steps performed subsequently to said step (d):

(e) providing a further variable value different from said first-mentioned variable value;

(f) generating a further memory address within said block based at least in part on said further variable value; and (g) overwriting the copy of said cryptographic keys stored beginning at said first-mentioned memory address with shrouding data, and re-storing said cryptographic keys within shrouding data beginning at said further generated memory address.

33. A secure method as in claim 32 wherein said steps (e)–(g) are performed each time a keyloader is connected to said radio device.

34. A secure method as in claim 31 further including encrypting said cryptographic keys at least in part in response to said stored shrouding data before storing said keys within said non-volatile memory.

35. A method as in claim 31 wherein said hiding step (d) comprises overwriting less than all of said shrouding data with said keys.

36. A method as in claim 31 wherein said hiding step (d) comprises encrypting said keys using a process responsive to said stored shrouding data.

37. A method of programming encryption key information into a digital radio communications device non-volatile memory comprising:

(a) writing a block of pseudo-random characters into a portion of said nonvolatile memory;

(b) selecting, based at least in part on a pseudo-random process, a location within said block; and (c) writing at least one cryptographic key into said memory portion at a place corresponding to said selected location, said pseudo-random characters shrouding said written key.

38. A method as in claim 37 further including:

(d) selecting a further location based at least in part on said pseudo-random process; and (e) writing said key into said memory portion at a different place corresponding to said further location.

39. A method as in claim 37 further including transforming said encryption key at least in part in response to at least some of said pseudo-random characters, and wherein said writing step (c) comprises writing said transformed encryption key into said memory portion.

40. A method as in claim 39 further including reading said transformed key from said memory portion, and inversely transforming said read transformed key in response to said at least some pseudo-random characters.

41. A method as in claim 37 further including reading said key from said memory portion, and transforming said read key in response to at least some of said pseudo-random characters.

42. A radio communications device comprising:

a non-volatile memory;

means for providing variable data;

address selecting means coupled to receive said variable data for selecting a memory address based at least in part on said variable data; and shrouding means coupled to said non-volatile memory and also coupled to said address selecting means, for storing shrouding data within said non-volatile memory and for storing at least one cryptographic key within said stored shrouding data beginning at said generated memory address.

43. An arrangement for programming encryption key information into a digital radio communications device non-volatile memory comprising:

means for writing shrouding characters into a portion of said memory;

means for pseudo-randomly selecting a location within said memory portion;

key encrypting means for encrypting a cryptographic key; and means coupled to said selecting means and to said key encrypting means for writing said encrypted cryptographic key into said memory portion at a place corresponding to said selected location and surrounded by said shrouding characters, said shrouding characters hiding said encrypted cryptographic key.

* * * * *